(12) United States Patent
Golitschek Edler von Elbwart et al.

(10) Patent No.: US 10,958,382 B2
(45) Date of Patent: Mar. 23, 2021

(54) SHORT LATENCY FAST RETRANSMISSION TRIGGERING

(71) Applicant: Panasonic Intellectual Property Corporation of America, Torrance, CA (US)

(72) Inventors: Alexander Golitschek Edler von Elbwart, Hessen (DE); Ayako Horiuchi, Osaka (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 47 days.

(21) Appl. No.: 16/300,455

(22) PCT Filed: May 13, 2016

(86) PCT No.: PCT/CN2016/082050
§ 371 (c)(1),
(2) Date: Nov. 9, 2018

(87) PCT Pub. No.: WO2017/193376
PCT Pub. Date: Nov. 16, 2017

(65) Prior Publication Data
US 2019/0149273 A1    May 16, 2019

(51) Int. Cl.
*H04L 1/18* (2006.01)
*H04W 52/48* (2009.01)
(Continued)

(52) U.S. Cl.
CPC ............. *H04L 1/1816* (2013.01); *H04L 1/00* (2013.01); *H04L 1/18* (2013.01); *H04L 1/1822* (2013.01);
(Continued)

(58) Field of Classification Search
None
See application file for complete search history.

(56) References Cited

U.S. PATENT DOCUMENTS 7,783,949 B2 *  8/2010  Lohr ...................... H04L 1/1671
                                                    714/751
7,979,770 B2 *  7/2011  Lohr ...................... H04L 5/0055
                                                    714/751
(Continued)

FOREIGN PATENT DOCUMENTS

CN    101174931 A    5/2008
CN    104380642 A    2/2015
(Continued)

OTHER PUBLICATIONS

Extended European Search Report, dated Apr. 24, 2019, for European Application No. 16901331.5-1219/3455971, 10 pages.
(Continued)

*Primary Examiner* — Phung M Chung
(74) *Attorney, Agent, or Firm* — Seed IP Law Group LLP

(57) ABSTRACT

The invention relates to an improved transmission protocol for uplink data packet transmission in a communication system. A receiver of a user equipment receives a Fast Retransmission Indicator, referred to as FRI. The FRI indicates whether or not a base station requests a retransmission of a previously transmitted data packet. A transmitter of the user equipment retransmits the data packet using the same redundancy version as already used for the previous transmission of the data packet.

15 Claims, 7 Drawing Sheets

(51) Int. Cl.
*H04L 1/00* (2006.01)
*H04L 12/18* (2006.01)

(52) U.S. Cl.
CPC .......... *H04L 1/1854* (2013.01); *H04L 1/1864* (2013.01); *H04L 1/1896* (2013.01); *H04W 52/48* (2013.01); *H04L 12/1872* (2013.01)

(56) References Cited

U.S. PATENT DOCUMENTS

| | | | | |
|---|---|---|---|---|
| 8,429,481 | B2* | 4/2013 | Lohr | H04L 1/0006 714/751 |
| 8,751,893 | B2* | 6/2014 | Lohr | H04L 1/1819 714/751 |
| 9,148,880 | B2* | 9/2015 | Ko | H04B 7/0623 |
| 9,391,754 | B2 | 7/2016 | Nammi et al. | |
| 2013/0028213 | A1* | 1/2013 | Ko | H04L 1/1816 370/329 |
| 2013/0051272 | A1 | 2/2013 | Wiberg et al. | |
| 2014/0126551 | A1 | 5/2014 | Nammi et al. | |
| 2015/0282130 | A1 | 10/2015 | Webb et al. | |
| 2017/0207895 | A1* | 7/2017 | Yang | H04W 72/042 |

FOREIGN PATENT DOCUMENTS

| | | |
|---|---|---|
| EP | 2 086 145 A2 | 5/2009 |
| JP | 2015-092758 A | 5/2015 |
| JP | 2016-504798 A | 2/2016 |
| WO | 2015/094257 A1 | 6/2015 |
| WO | 2016/021957 A1 | 2/2016 |
| WO | 2016/053451 A1 | 4/2016 |

OTHER PUBLICATIONS

Japanese Office Action, dated Sep. 10, 2019, for Japanese Application No. 2018-553488, 12 pages. (with English translation).

3GPP TS 36.211 V8.9.0, $3^{rd}$ Generation Partnership Project; Technical Specification Group Radio Access Network; Evolved Universal Terrestrial Radio Access (E-UTRA); Physical Channels and Modulation (Release 8), Dec. 2009, 83 pages.
3GPP TS 36.211 V13.0.0, "$3^{rd}$ Generation Partnership Project; Technical Specification Group Radio Access Network; Evolved Universal Terrestrial Radio Access (E-UTRA); Physical channels and modulation (Release 13)," Dec. 2015, 142 pages.
3GPP TS 36.211 V13.1.0, "$3^{rd}$ Generation Partnership Project; Technical Specification Group Radio Access Network; Evolved Universal Terrestrial Radio Access (E-UTRA); Physical channels and modulation (Release 13)," Mar. 2016, 155 pages.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)," Dec. 2015, 326 pages.
3GPP TS 36.321 V13.0.0, "3rd Generation Partnership Project; Technical Specification Group Radio Access Network; Evolved Universal Terrestrial Radio Access (E-UTRA); Medium Access Control (MAC) protocol specification (Release 13)," Dec. 2015, 82 pages.
3GPP TS 36.321 V13.1.0, "3rd Generation Partnership Project; Technical Specification Group Radio Access Network; Evolved Universal Terrestrial Radio Access (E-UTRA); Medium Access Control (MAC) protocol specification (Release 13)," Mar. 2016, 85 pages.
3GPP TS 36.322 V13.0.0 "3rd Generation Partnership Project; Technical Specification Group Radio Access Network; Evolved Universal Terrestrial Radio Access (E-UTRA); Radio Link Control (RLC) protocol specification (Release 13)," Dec. 2015, 44 pages.
International Search Report, dated Jan. 26, 2017, for International Application No. PCT/CN2016/082050, 3 pages.

* cited by examiner

SHORT LATENCY FAST RETRANSMISSION TRIGGERING

BACKGROUND

Technical Field

The present disclosure relates to methods for operating a transmission protocol for uplink data packet transmission in a communication system. The present disclosure is also providing the user equipment and base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques, and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}$=110 are respectively the smallest and the largest downlink bandwidths, supported by the current version of the specification. $N_{sc}^{RB}$ is the number of subcarriers within one resource block. For normal cyclic prefix subframe structure, $N_{sc}^{RB}$=12 and $N_{symb}^{DL}$=7.

Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)," current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair," or equivalent "RB pair" or "PRB pair."

The term "component carrier" refers to a combination of several resource blocks in the frequency domain. In future releases of LTE, the term "component carrier" is no longer used; instead, the terminology is changed to "cell," which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, then n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g., the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks etc. More information on the functioning of the physical layer can be found in the 3GPP technical standard 36.213 current version 13.0.0, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer. The main services and functions of the RLC sublayer include:

Transfer of upper layer PDUs supporting AM, UM or TM data transfer;
Error Correction through ARQ;
Segmentation according to the size of the TB;
Resegmentation when necessary (e.g., when the radio quality, i.e., the supported TB size changes)
Concatenation of SDUs for the same radio bearer is FFS;
In-sequence delivery of upper layer PDUs;
Duplicate Detection;
Protocol error detection and recovery;
SDU discard;
Reset The ARQ functionality provided by the RLC layer will be discussed in more detail at a later part.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format and other data related information (e.g., HARQ) L1/L2 control signaling needs to be transmitted on the downlink along with the data. The control signaling needs to be multiplexed with the downlink data in a sub frame (assuming that the user allocation can change from sub frame to sub frame). Here, it should be noted, that user allocation might also be performed on a TTI (Transmission Time Interval) basis, where the TTI length is a multiple of the sub frames. The TTI length may be fixed in a service area for all users, may be different for different users, or may even by dynamic for each user. Generally, then the L1/2 control signaling needs only be transmitted once per TTI. The L1/L2 control signaling is transmitted on the Physical Downlink Control Channel (PDCCH). It should be noted that assignments for uplink data transmissions, UL grants, are also transmitted on the PDCCH.

In the following the detailed L1/L2 control signaling information signaled for DL allocation respectively uplink assignments is described in the following:

Downlink Data Transmission

Along with the downlink packet data transmission, L1/L2 control signaling is transmitted on a separate physical channel (PDCCH). This L1/L2 control signaling typically contains information on:

- The physical resource(s) on which the data is transmitted (e.g., subcarriers or subcarrier blocks in case of OFDM, codes in case of CDMA). This information allows the UE (receiver) to identify the resources on which the data is transmitted.
- The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the UE (receiver) to identify the information bit size, the modulation scheme and the code rate in order to start the demodulation, the de rate matching and the decoding process. In some cases the modulation scheme maybe signaled explicitly.
- Hybrid ARQ (HARD) information:
  - Process number: Allows the UE to identify the hybrid ARQ process on which the data is mapped
  - Sequence number or new data indicator: Allows the UE to identify if the transmission is a new packet or a retransmitted packet
  - Redundancy and/or constellation version: Tells the UE, which hybrid ARQ redundancy version is used (required for de-rate matching) and/or which modulation constellation version is used (required for demodulation)
- UE Identity (UE ID): Tells for which UE the L1/L2 control signaling is intended for. In typical implementations this information is used to mask the CRC of the L1/L2 control signaling in order to prevent other UEs to read this information.

Uplink Data Transmission

To enable an uplink packet data transmission, L1/L2 control signaling is transmitted on the downlink (PDCCH) to tell the UE about the transmission details. This L1/L2 control signaling typically contains information on:

- The physical resource(s) on which the UE should transmit the data (e.g., subcarriers or subcarrier blocks in case of OFDM, codes in case of CDMA).
- The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate matching and the encoding process. In some cases the modulation scheme maybe signaled explicitly.
- Hybrid ARQ information:
  - Process number: Tells the UE from which hybrid ARQ process it should pick the data
  - Sequence number or new data indicator: Tells the UE to transmit a new packet or to retransmit a packet
  - Redundancy and/or constellation version: Tells the UE, which hybrid ARQ redundancy version to use (required for rate matching) and/or which modulation constellation version to use (required for modulation)
- UE Identity (UE ID): Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:

- HARQ process number may not be needed in case of a synchronous HARQ protocol
- A redundancy and/or constellation version may not be needed if Chase Combining is used (always the same redundancy and/or constellation version) or if the sequence of redundancy and/or constellation versions is predefined.
- Power control information may be additionally included in the control signaling
- MIMO related control information, such as e.g., precoding, may be additionally included in the control signaling.
- In case of multi-codeword MIMO transmission transport format and/or HARQ information for multiple code words may be included.

For uplink resource assignments (PUSCH) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RV0. The size of the CRC field of the PDCCH is 16 bits. Further detailed information on the control information for uplink resource allocation on PUSCH can be found in TS36.212 section 5.3.3 and TS36.213 section 8.6.

For downlink assignments (PDSCH) signaled on PDCCH in LTE, the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled. Further detailed information on the control information for uplink resource allocation on PUSCH can be found in TS36.212 section 5.3.3 and TS36.213 section 7.1.7, incorporated by reference herein.

E-UTRAN Measurements—Measurement Gaps

The E-UTRAN can configure the UE to report measurement information e.g., to support the control of the UE mobility. The respective measurement configuration elements can be signaled via the RRCConnectionReconfiguration message. For instance, measurement gaps define time periods when no uplink or downlink transmissions will be scheduled, so that the UE may perform the measurements.

The measurement gaps are common for all gap-assisted measurements. Inter-frequency measurements may require the configuration of measurement gaps, depending on the capabilities of the UE (e.g., whether it has a dual receiver). The UE identifies E-UTRA cells operating on carrier frequencies other than that of the serving cell. Inter-frequency measurements, including cell identification, or performed during periodic measurement gaps, unless the UE has more than one receiver. Two possible gap patterns can be configured by the network, each with a length of 6 ms: in gap pattern #0, the gap occurs every 40 ms, while in gap pattern #1 the gap occurs every 80 ms.

For example, the Reference Signal Received Power (RSRP) is measured by the UE over the cell-specific reference signals within the measurement bandwidth over a measurement period.

ARQ/Hybrid ARQ (HARQ) Schemes

In LTE there are two levels of re-transmissions for providing reliability, namely, HARQ at the MAC layer and outer ARQ at the RLC layer. The RLC retransmission mechanism is responsible for providing error-free delivery of data to higher layer. To accomplish this, a (re)transmission protocol operates between the RLC entities in the receiver and transmitter, e.g., in the acknowledged mode. Although the RLC layer would be capable of handling transmission errors due to noise, unpredictable channel variations, etc., this is in most cases handled by the HARQ retransmission protocol of the MAC layer. The use of a retransmission mechanism in the RLC layer may therefore seem superfluous at first. However, this is not the case, and the use of both RLC- and MAC-based retransmission mechanisms is in fact well motivated by the differences in the feedback signaling. For instance, the RLC-ARQ mechanism takes care of the possible NACK to ACK errors that may occur with the MAC HARQ mechanism.

A common technique for error detection and correction in packet transmission systems over unreliable channels is called hybrid Automatic Repeat request (HARQ). Hybrid ARQ is a combination of Forward Error Correction (FEC) and ARQ. If a FEC encoded packet is transmitted and the receiver fails to decode the packet correctly (errors are usually checked by a CRC, Cyclic Redundancy Check), the receiver requests a retransmission of the packet RLC Retransmission Protocol When the RLC is configured to request retransmission of missing PDUs, it is said to be operating in Acknowledged Mode (AM). This is similar to the corresponding mechanism used in WCDMA/HSPA.

Overall, there are three operational modes for RLC: Transparent Mode (TM), Unacknowledged Mode (UM), and Acknowledged Mode (AM). Each RLC entity is configured by RRC to operate in one of these modes.

In Transparent Mode no protocol overhead is added to RLC SDUs received from higher layer. In special cases, transmission with limited segmentation/reassembly capability can be accomplished. It has to be negotiated in the radio bearer setup procedure, whether segmentation/reassembly is used. The transparent mode is e.g., used for very delay-sensitive services like speech.

In Unacknowledged Mode data delivery is not guaranteed since no retransmission protocol is used. The PDU structure includes sequence numbers for integrity observations in higher layers. Based on the RLC sequence number, the receiving UM RLC entity can perform reordering of the received RLC PDUs. Segmentation and concatenation are provided by means of header fields added to the data. The RLC entity in Unacknowledged mode is unidirectional, since there are no associations defined between uplink and downlink. If erroneous data is received, the corresponding PDUs are discarded or marked depending on the configuration. In the transmitter, the RLC SDUs which are not transmitted within a certain time specified by a timer are discarded and removed from the transmission buffer. The RLC SDUs, received from higher layer, are segmented/concatenated into RLC PDUs on sender side. On receiver side, reassembly is performed correspondingly. The unacknowledged mode is used for services where error-free delivery is of less importance compared to short delivery time, for example, for certain RRC signaling procedures, a cell broadcast service such as MBMS and voice over IP (VoIP).

In Acknowledged Mode the RLC layer supports error correction by means of an Automatic Repeat Request (ARQ) protocol, and is typically used for IP-based services such as file transfer where error-free data delivery is of primary interest. RLC retransmissions are for example based on RLC status reports, i.e., ACK/NACK, received from the peer RLC receiving entity. The acknowledged mode is designed for a reliable transport of packet data through retransmission in the presence of high air-interface bit error rates. In case of erroneous or lost PDUs, retransmission is conducted by the sender upon reception of an RLC status report from the receiver.

ARQ is used as a retransmission scheme for retransmission of erroneous or missed PDUs. For instance, by monitoring the incoming sequence numbers, the receiving RLC entity can identify missing PDUs. Then, an RLC status report can be generated at the receiving RLC side, and fed back to the transmitting RLC entity, requesting retransmission of missing or unsuccessfully decoded PDUs. The RLC status report can also be polled by the transmitter, i.e., the polling function is used by the RLC transmitter to obtain a status report from RLC receiver so as to inform the RLC transmitter of the reception buffer status. The status report provides positive acknowledgements (ACK) or negative acknowledgment information (NACK) on RLC Data PDUs or portions of them, up to the last RLC Data PDU whose HARQ reordering is complete. The RLC receiver triggers a status report if a PDU with the polling field set to '1' or when an RLC Data PDU is detected as missing. There are certain triggers defined in subclause 5.2.3 of TS36.322, current version 13.0.0, incorporated herein by reference, which trigger a poll for an RLC status report in the RLC transmitter. In the transmitter, transmission is only allowed for the PDUs within the transmission window, and the transmission window is only updated by the RLC status report. Therefore, if the RLC status report is delayed, the transmission window cannot be advanced and the transmission might get stuck.

The receiver sends the RLC status report to the sender when triggered.

As already mentioned before, in addition to data PDU delivery, control PDUs can be signaled between the peer entities.

MAC HARQ Protocol

The MAC layer comprises a HARQ entity, which is responsible for the transmit and receive HARQ operations. The transmit HARQ operation includes transmission and retransmission of transport blocks, and reception and processing of ACK/NACK signaling. The receive HARQ operation includes reception of transport blocks, combining of the received data and generation of ACK/NACK signaling. In order to enable continuous transmission while previous transport blocks are being decoded, up to eight HARQ processes in parallel are used to support multiprocess "Stop- And-Wait" (SAW) HARQ operation. Each HARQ process is responsible for a separate SAW operation and manages a separate buffer.

The feedback provided by the HARQ protocol is either an Acknowledgment (ACK) or a negative Acknowledgment (NACK). ACK and NACK are generated depending on whether a transmission could be correctly received or not (e.g., whether decoding was successful). Furthermore, in HARQ operation the eNB can transmit different coded versions from the original transport block in retransmissions so that the UE can employ incremental-redundancy-(IR)-combining to get additional coding gain via the combining gain.

If a FEC-encoded packet is transmitted and the receiver fails to decode the packet correctly (errors are usually checked by a CRC, Cyclic Redundancy Check), the receiver requests a retransmission of the packet. Generally (and throughout this document), the transmission of additional information is called "retransmission (of a packet)," and this retransmission could but does not necessarily mean a transmission of the same encoded information; it could also mean the transmission of any information belonging to the packet (e.g., additional redundancy information) e.g., by use of different redundancy versions.

In general, HARQ schemes can be categorized as either synchronous or asynchronous, with the retransmissions in each case being either adaptive or non-adaptive. Synchronous HARQ means that the retransmissions of transport blocks for each HARQ process occur at pre-defined (periodic) times relative to the initial transmission. Hence, no explicit signaling is required to indicate to the receiver the retransmission schedule, or e.g., the HARQ process number since it can be inferred from the transmission timing.

In contrast, asynchronous HARQ allows the retransmissions to occur at any time relative to the initial transmission, which offers the flexibility of scheduling retransmissions based on air-interface conditions. In this case however, additional explicit signaling is required to indicate e.g., the HARQ process to the receiver, in order to allow for a correct combining and protocol operation. In 3GPP LTE systems, HARQ operations with eight processes are used.

In LTE, asynchronous adaptive HARQ is used for the downlink, and synchronous HARQ for the uplink. In the uplink, the retransmissions may be either adaptive or non-adaptive, depending on whether new signaling of the transmission attributes is provided, e.g., in an uplink grant.

In uplink HARQ protocol operation (i.e., for acknowledging uplink data transmissions) there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions).

In case of a synchronous non-adaptive retransmission, the retransmission will use the same parameters as the previous uplink transmission, i.e., the retransmission will be signaled on the same physical channel resources, respectively uses the same modulation scheme/transport format. The redundancy version though will change, i.e., cycle through the predefined sequence of redundancy versions which is 0, 2, 3, 1.

Since synchronous adaptive retransmissions are explicitly scheduled via the PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing for UL HARQ FDD operation. Therefore, the user equipment only needs to check once whether a synchronous non-adaptive retransmission is triggered (i.e., only a NACK is received) or whether eNodeB requests a synchronous adaptive retransmission (i.e., PDCCH is also signaled).

The PHICH carries the HARQ feedback, which indicates whether the eNodeB has correctly received a transmission on the PUSCH. The HARQ indicator is set to 0 for a positive Acknowledgement (ACK) and 1 for a negative Acknowledgment (NACK). The PHICH carrying an ACK/NACK message for an uplink data transmission may be transmitted at the same time as the Physical Downlink Control Channel, PDCCH, for the same user terminal. With such a simultaneous transmission, the user terminal is able to determine what the PDCCH instructs the terminal to do, i.e., to perform a new transmission (new UL grant with toggled NDI) or a retransmission (referred to as adaptive retransmission) (new UL grant without toggled NDI), regardless of the PHICH content. When no PDCCH for the terminal is detected, the PHICH content dictates the UL HARQ behavior of the terminal, which is summarized in the following.

NACK: the terminal performs a non-adaptive retransmission, i.e., a retransmission on the same uplink resource as previously used by the same HARQ process ACK: the terminal does not perform any uplink retransmission and keeps the data in the HARQ buffer for that HARQ process. A further transmission for that HARQ process needs to be explicitly scheduled by a subsequent grant by PDCCH. Until the reception of such grant, the terminal is in a "suspension state."

This is illustrated in the following Table 11:

| HARQ feedback seen by the UE (PHICH) | PDCCH seen by the UE | UE behavior |
| --- | --- | --- |
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

The schedule timing of the uplink HARQ protocol in LTE is exemplarily illustrated in FIG. 3. The eNB transmits to the UE a first uplink grant 301 on PDCCH, in response to which, the UE transmits first data 302 to the eNB on PUSCH. The timing between the PDCCH uplink grant and the PUSCH transmission is currently fixed to 4 ms. After receiving the first data transmission 302 from the UE, the eNB transmits feedback information (ACK/NACK) and possibly an UL grant 303 for the received transmission to the UE (alternatively, when the UL transmission was successful, the eNB could have triggered a new uplink transmission by transmitting a suitable second uplink grant). The timing between the PUSCH transmission and the corresponding PHICH carrying the feedback information is currently also fixed to 4 ms. Consequently, the Round Trip Time (RTT) indicating the next (re)transmission opportunity in the uplink HARQ protocol is 8 ms. After these 8 ms, the UE may transmit a retransmission 304 of previous data as instructed by the eNB. For the further operation, it is assumed that the retransmission 304 of a previously transmitted data packet was again not successful such that the eNodeB would instruct the UE to perform another retransmission (e.g., transmitting a NACK 305 as a feedback). In response thereto, the UE would thus perform a further retransmission 306.

At the top of FIG. 3, the subframe numbering is listed as well as an exemplary association of the HARQ processes with the subframes. As apparent therefrom, each of the 8 available HARQ processes is cyclically associated with a respective subframe. In the exemplary scenario of FIG. 3, it is assumed that the initial transmission 302 and the corresponding retransmissions thereof 304 and 306 are handled by the same HARQ process number 5.

Measurement gaps for performing measurements at the UE are of higher priority than HARQ retransmissions. Thus, whenever an HARQ retransmission collides with a measurement gap, the HARQ retransmission does not take place. On the other hand, whenever a HARQ feedback transmission over the PHICH collides with a measurement gap, the UE assumes an ACK as the content of the expected HARQ feedback.

There are several fields in the downlink control information to aid the HARQ operation:
  New Data Indicator (NDI): toggled whenever a transmission of a transport block is scheduled, i.e., also referred to as initial transmission ("toggled" means that the NDI bit provided in the associated HARQ information has been changed/toggled compared to the value in the previous transmission of this HARQ process)
  Redundancy Version (RV): indicates the RV selected for the transmission or retransmission
  MCS: Modulation and Coding scheme HARQ operation is complex and will/cannot be described in full in this application, nor is it necessary for the full understanding of the invention. A relevant part of the HARQ operation is defined e.g., in 3GPP TS 36.321, version 13.0.0, clause 5.4.2 "HARQ operation," incorporated by reference herein, and wherein parts thereof will be recited in the following.

5.4.2 HARQ Operation
  5.4.2.1 HARQ Entity

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

The number of parallel HARQ processes per HARQ entity is specified in [2], clause 8.

When the physical layer is configured for uplink spatial multiplexing [2], there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e., the TTI corresponding to TTI_BUNDLE_SIZE), regardless of whether a transmission in that TTI takes place or not (e.g., when a measurement gap occurs). A retransmission of a TTI bundle is also a TTI bundle. TTI bundling is not supported when the MAC entity is configured with one or more SCells with configured uplink.

TTI bundling is not supported for RN communication with the E-UTRAN in combination with an RN subframe configuration.

For transmission of Msg3 during Random Access (see subclause 5.1.5) TTI bundling does not apply.

For each TTI, the HARQ entity shall:
  identify the HARQ process(es) associated with this TTI, and for each identified HARQ process:
    if an uplink grant has been indicated for this process and this TTI:
      if the received grant was not addressed to a Temporary C-RNTI on PDCCH and if the NDI provided in the associated HARQ information has been toggled compared to the value in the previous transmission of this HARQ process; or
      if the uplink grant was received on PDCCH for the C-RNTI and the HARQ buffer of the identified process is empty; or
      if the uplink grant was received in a Random Access Response:
        if there is a MAC PDU in the Msg3 buffer and the uplink grant was received in a Random Access Response:
          obtain the MAC PDU to transmit from the Msg3 buffer.
        else:
          obtain the MAC PDU to transmit from the "Multiplexing and assembly" entity;
          deliver the MAC PDU and the uplink grant and the HARQ information to the identified HARQ process;
          instruct the identified HARQ process to trigger a new transmission.
      else:
        deliver the uplink grant and the HARQ information (redundancy version) to the identified HARQ process;
        instruct the identified HARQ process to generate an adaptive retransmission.
    else, if the HARQ buffer of this HARQ process is not empty:
      instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

Uplink HARQ Protocol for NB-IoT/eMTC

For NB-IoT as well as eMTC (Rel-13), an asynchronous UL HARQ protocol has been introduced (and is being discussed for the ongoing Rel-14 work item for uplink on unlicensed carriers). Different to the synchronous Uplink HARQ protocol used for legacy LTE, retransmissions for NB-IoT or eMTC UEs are adaptive and asynchronous. More in particular the retransmissions don't need to occur at a fixed timing relative to the previous HARQ transmission for the same process, which offers the flexibility of scheduling retransmissions explicitly. Furthermore there will be no explicit HARQ feedback channel (PHICH), i.e., retransmissions/initial transmissions are indicated by PDCCH (NDI distinguished between initial and retransmission). Essentially the uplink HARQ protocol behavior for NB-IoT or eMTC UEs will be very similar to the asynchronous HARQ protocol used for the downlink since Rel-8.

It should be noted that for NB IoT there will be only one UL HARQ process.

For more information on the asynchronous uplink HARQ protocol introduced for NB-IoT/eMTC UEs, it is referred to section 5.4.2 of 3GPP TS 36.321 V13.1.0 (2016-03), incorporated by reference herein.

Short Latency Study Item

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

In the 3GPP community, much effort has been put into increasing data rates from the first release of LTE (release 8) until the most recent one (release 12). Features like Carrier Aggregation (CA), 8×8 MIMO, 256 QAM have raised the technology potential of the L1 data rate from 300 Mbps to 4 Gbps. In Rel-13, 3GPP aims to introduce even higher bit rates by introducing up to 32 component carriers in CA.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps with Rel-13 CA), UE buffers need to be dimensioned correspondingly. The longer the RTT is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher BLER targets could be used for the data transmissions, freeing up radio resources but still keeping the same level of robustness for users in poor radio conditions. The increased number of possible transmissions within a certain delay bound, could also translate into more robust transmissions of real-time data streams (e.g., VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g., smart glasses, or specific machine communications requiring low latency as well as critical communications.

Various pre-scheduling strategies can be used to lower the latency to some extent, but similarly to shorter Scheduling Request (SR) interval introduced in Rel-9, they do not necessarily address all efficiency aspects.

It should also be noted that reduced latency of user plane data may also indirectly give shorter call set-up/bearer set-up times, due to faster transport of control signaling.

To ensure LTE evolution and competitiveness it appears therefore necessary to study and improve the packet data latencies.

The objective of this study item is to study enhancements to the E-UTRAN radio system in order to:
  Significantly reduce the packet data latency over the LTE Uu air interface for an active UE, and
  Significantly reduce the packet data transport round trip latency for UEs that have been inactive for a longer period (in connected state).

The study area includes resource efficiency, including air interface capacity, battery lifetime, control channel resources, specification impact and technical feasibility. Both FDD and TDD duplex modes are considered.

As first aspect, potential gains like reduced response time and improved TCP throughput due to latency improvements on typical applications and use cases are identified and documented. In conclusion, this aspect of the study is supposed to show what latency reductions would be desirable.

As second aspect, the following areas should be studied and documented:
  Fast uplink access solutions:
    for active UEs and UEs that have been inactive a longer time, but are kept in RRC Connected, focus should be on reducing user plane latency for the scheduled UL transmission and getting a more resource efficient solution with protocol and signaling enhancements, compared to the pre-scheduling solutions allowed by the standard today, both with and without preserving the current TTI length and processing times;
  TTI shortening and reduced processing times:
    Assess specification impact and study feasibility and performance of TTI lengths between 0.5 ms and one OFDM symbol, taking into account impact on reference signals and physical layer control signaling;
    backwards compatibility shall be preserved (thus allowing normal operation of pre-Rel 13 UEs on the same carrier).
  Processing Chain Functions for Uplink The processing chain as illustrated in FIG. 4 is taken from section 5.2.2 of 3GPP TS 36.212 V13.1.0 (2016-03), incorporated by reference herein.

FIG. 4 shows a block diagram including coding chain functionalities within the physical layer for a single codeword/transport block. The input consists of the transport block handed down by the MAC layer. For retransmissions of a transport block, the redundancy version (RV) is an input parameter within the "Rate matching block." Consequently, if a retransmission uses a different RV, at least the blocks "Rate matching," "Code block concatenation," "Data and Control multiplexing," and "Channel Interleaver" need to be processed.

The output of the block "Channel Interleaver" serves as a "codeword" input to the physical channel processing steps shown in FIG. 5, which is taken from section 5.3 of 3GPP TS 36.211 V13.1.0 (2016-03), incorporated by reference herein.

FIG. 5 shows a block diagram including physical channel processing functionalities within the physical layer. The input consists of the codeword(s) obtained as the result of the coding chain depicted in FIG. 5.2.2-1 of 3GPP TS 36.212. It should be noted that for normal (non-MTC or NB-IoT) processing, the "Scrambling" block has among its input parameters the transmission subframe index within a radio frame. Therefore the output of the "Scrambling" block is different for different subframe indices, even if the codeword(s) input should be identical. For retransmissions of a transport block, the redundancy version (RV) is an input parameter within the "Rate matching block." Consequently, if a retransmission uses a different RV, at least the blocks "Rate matching," "Code block concatenation," "Data and Control multiplexing," and "Channel Interleaver" need to be processed.

BRIEF SUMMARY

Non-limiting and exemplary embodiments provide an improved transmission protocol operation for uplink data packet transmissions for a user equipment.

The independent claims provide non-limiting and exemplary embodiments. Advantageous embodiments are subject to the dependent claims.

According to several aspects described herein, the transmission protocol operation shall be improved.

According to one general aspect, a user equipment is described that operates a transmission protocol for uplink data packet transmission in a communication system, wherein the user equipment comprises a receiver that receives a Fast Retransmission Indicator. Thereby, the Fast Retransmission Indicator indicates whether or not a base station requests a retransmission of a previously transmitted data packet. The user equipment comprises a transmitter that retransmits the data packet using the same redundancy version as already used for the previous transmission of the data packet.

According to another general aspect, a base station is described that operates a transmission protocol for uplink data packet transmission in a communication system, wherein the base station comprises a transmitter that transmits a Fast Retransmission Indicator. Thereby, the Fast Retransmission Indicator indicates to the user equipment whether or not the base station requests a retransmission of a previously transmitted data packet. The base station comprises a receiver that receives, from the user equipment, the retransmitted data packet with the same redundancy version as already used, by the user equipment, for the previous transmission of the data packet.

Correspondingly, in another general aspect, the techniques disclosed here feature a method for operating a transmission protocol in a user equipment for uplink data packet transmission in a communication system. The method comprises receiving a Fast Retransmission Indicator, referred to as FRI, wherein the FRI indicates whether or not a base station requests a retransmission of a previously transmitted data packet. The method further comprises retransmitting the data packet using the same redundancy version as already used for the previous transmission of the data packet.

Correspondingly, in another general aspect, the techniques disclosed here feature a method for operating a transmission protocol in a base station for uplink data packet transmission in a communication system. The method comprises transmitting a Fast Retransmission Indicator, referred to as FRI, wherein the FRI indicates to a user equipment whether or not a retransmission of a previously transmitted data packet is requested. The method further comprises receiving, from the user equipment, the retransmitted data packet with the same redundancy version as already used, by the user equipment, for the previous transmission of the data packet.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

DETAILED DESCRIPTION

Figure 1:
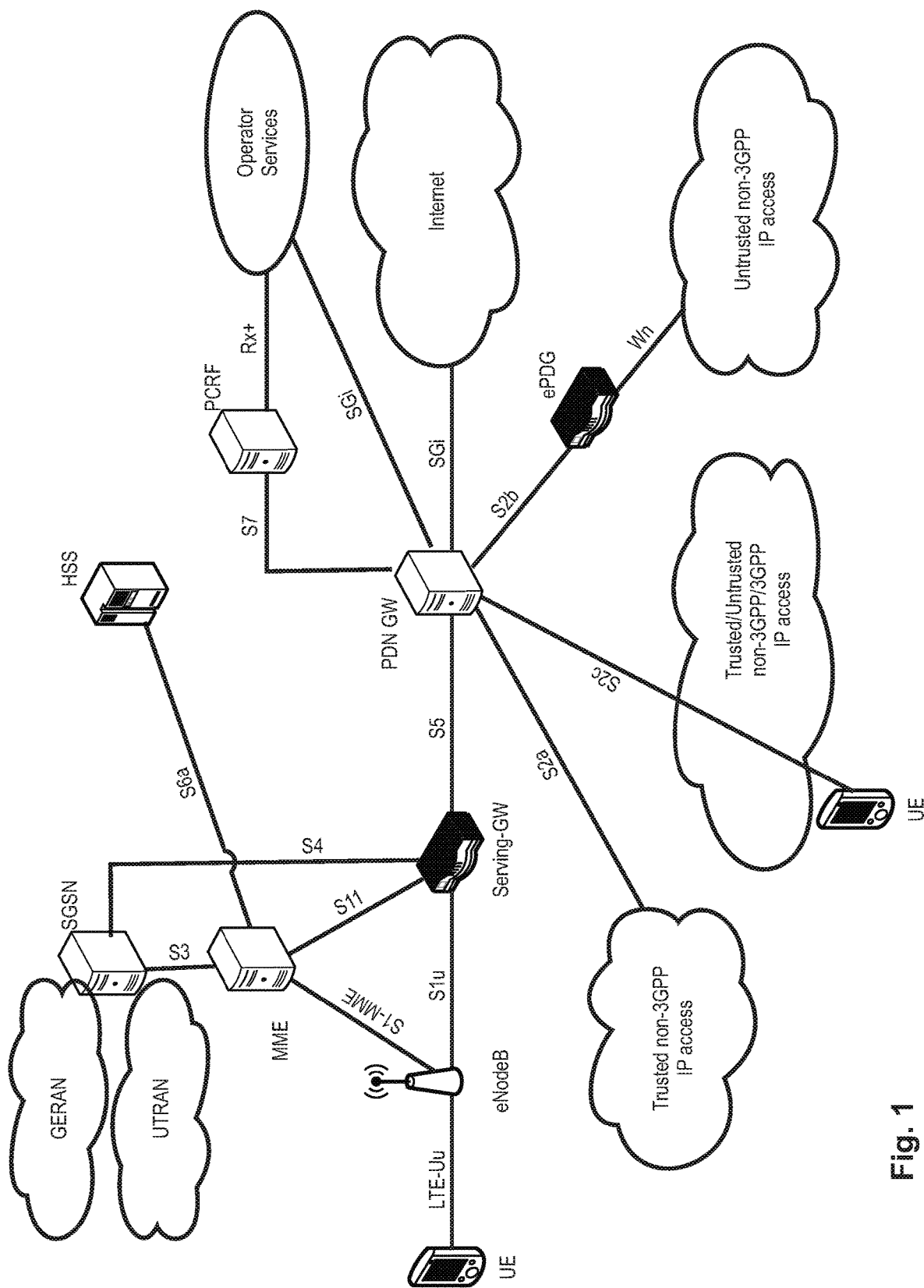
FIG. 1 shows an exemplary architecture of a 3GPP LTE system.
Figure 2:
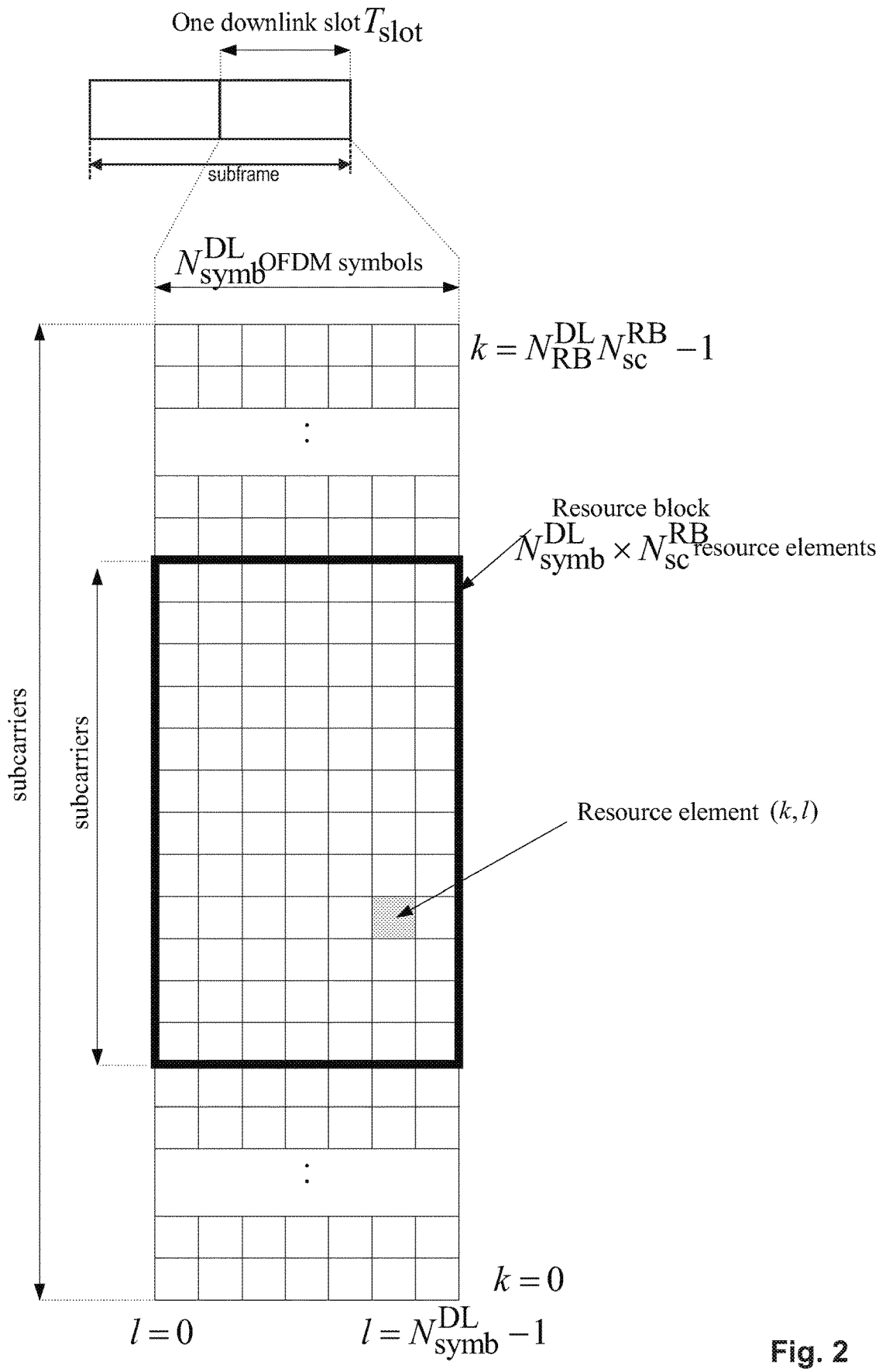
FIG. 2 shows an exemplary downlink resource grid of a downlink slot of a subframe as defined for 3GPP LTE (Release 8/9), FIG. 3 exemplary illustrates the transmission protocol operation between the UE and the eNodeB for an uplink transmission and its retransmissions, FIG. 4 schematically illustrates a block diagram including coding chain functionalities within the physical layer for a single codeword/transport block, FIG. 5 schematically illustrates a block diagram including physical channel processing functionalities within the physical layer.
Figure 3:
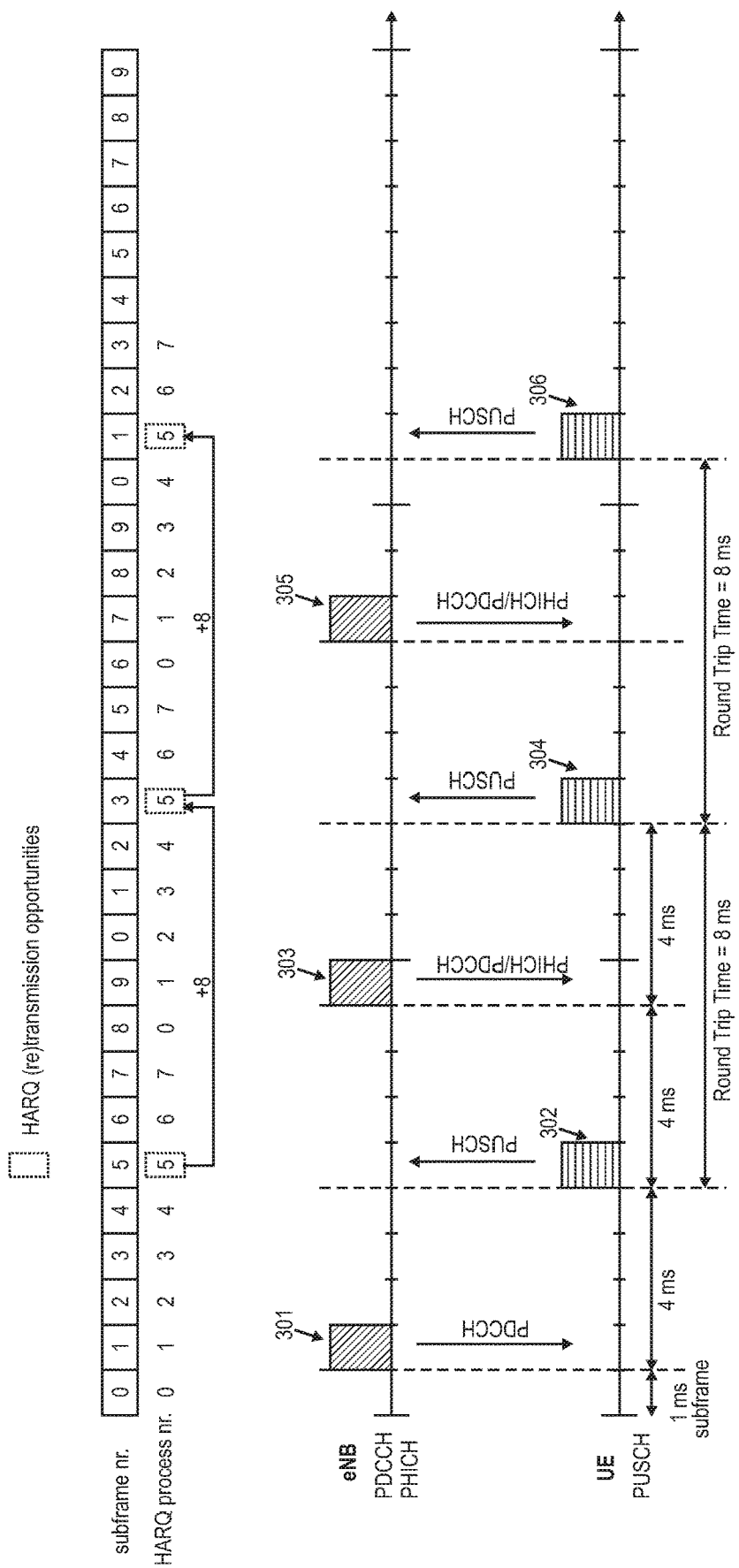

As can be seen from FIG. 3 and the description thereof in the background section, there is currently a delay of 4 ms between a PDCCH/PHICH and a corresponding PUSCH uplink transmission. This delay is mainly caused due to the processing that needs to be done at the UE side, including the detection of PDCCH/PHICH as well as the coding chain and physical channel processing steps outlined above. Even though this latency of 4 ms could be reduced by shortening the TTI as is being discussed within the scope of the above-described Short Latency study item, the main savings in time would be due to the smaller transport block sizes and a potentially improved hardware/software design that allows faster processing. Nevertheless, the savings are still bounded by the need for processing all the functional blocks in the transmission chain as outlined above, even for a retransmission, especially when a different RV is used for a retransmission compared to the previous transmission of the same transport block (data packet).

Another delay that is currently 4 ms long is the gap between a PUSCH transmission and the next potential trigger by PDCCH/PHICH for the same HARQ process. This gap is caused by the need of the eNB to process the PUSCH and attempt the decoding of same, and in case of an unsuccessful decoding attempt, to determine again the proper scheduling and link adaptation procedures to determine an appropriate set of physical layer transmission parameters (including the MCS, number and position of RBs, RV, transmit power) for the retransmissions, which needs to take other users' needs for uplink transmission into account as well. Finally, once these parameters are determined, they need to be conveyed to the UE by a DCI on (E)PDCCH (for an adaptive retransmission) and/or by an HI on a PHICH (for a non-adaptive retransmission).

Even though a PHICH could be seen as a compact method to trigger a non-adaptive retransmission, especially due to the different RV version and the subframe-dependent scrambling, the UE would still need to execute a substantial number of steps before being able to transmit.

The object of the invention is to reduce the delay between the transmission on PUSCH from the UE and a corresponding retransmission indication by the eNodeB. A further object is to also to reduce the delay between an indication for a retransmission by the eNodeB and the corresponding retransmission on PUSCH from the UE.

The following exemplary embodiment is conceived by the inventors to mitigate one or more of the problems explained above.

Particular implementations of the several variants of the embodiment are to be implemented in the wide specification as given by the 3GPP standards and explained partly in the background section, with the particular key features being added as explained in the following pertaining to the described embodiment. It should be noted that the embodiment may be advantageously used for example in a mobile communication system, such as 3GPP LTE-A (Release 10/11/12/13) communication systems as described in the Technical Background section above, but the embodiment is not limited to its use in this particular exemplary communication networks.

The explanations should not be understood as limiting the scope of the disclosure, but as a mere example of the embodiment to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiment.

In the following, an embodiment for solving the above-mentioned problem(s) will be described in detail. Different implementations and variants of the embodiment will be explained as well.

The embodiment provides a user equipment (UE) operating a transmission protocol for uplink data packet transmission in a communication system. According to the transmission protocol, a Fast Retransmission Indicator (FRI) is used for triggering a faster retransmission at the UE with reduced timing in case of an unsuccessful PUSCH decoding attempt at the eNodeB. If employing this FM, it is possible to transmit a retransmission request earlier by the eNodeB than it is possible with the use of a DCI/HI.

In order for the UE to retransmit a data packet quicker than it would be possible in response to a DCI, the UE may use, according to one variant of the embodiment, for its retransmission of the data packet not only the same radio resources as if a non-adaptive retransmission is triggered by HI, but also uses other identical parameters as they were applicable for the latest transmitted data packet, which was triggered by a DCI or HI.

Likewise, the embodiment provides a base station operating a transmission protocol for uplink data packet transmission where the FRI is transmitted to the UEs so as to indicate whether or not a retransmission of a previously transmitted data packet is requested. In reaction to such request, the base station receives from the UE the retransmitted data packet with the same redundancy version as already used for the previous transmission of the data packet.

As a general consideration, if the eNodeB intends to trigger a fast retransmission of a data packet, e.g., due to a time-critical Quality-of-Service requirement, it is more important to have a retransmission as fast as possible at the possible expense of a non-optimum use of the radio channel capacity. As a key aspect for achieving such a fast retransmission of the data packet, the eNodeB does not need to make a full link adaptation assessment since all parameters are already decided for the previous transmission of the data packet.

Figure 4:
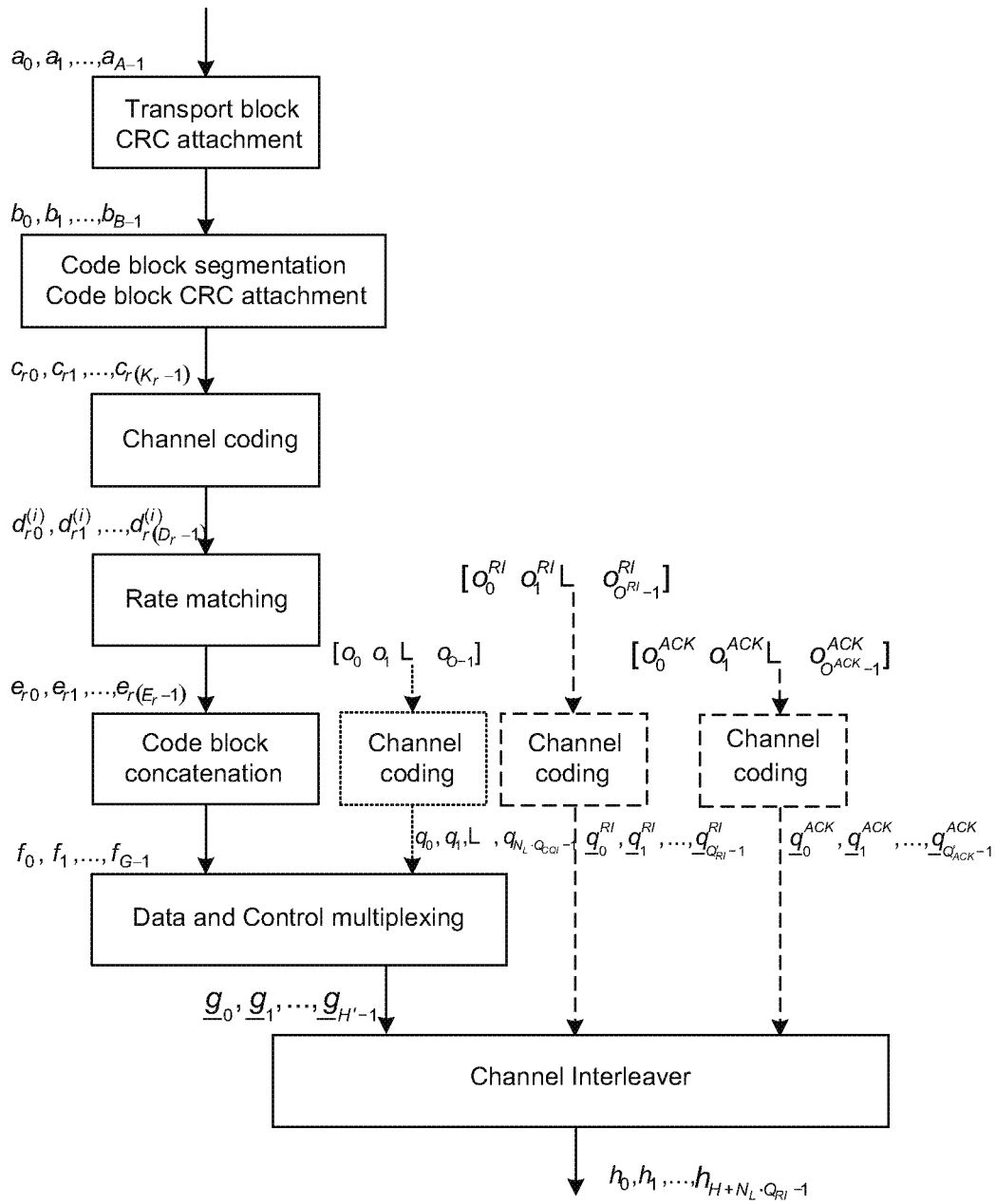

In the background section it has already been explained that, even if using a HI for retransmission, the redundancy version will change for the retransmitted data block. In this case, the redundancy version is cycled through the predefined sequence of redundancy versions, which is 0, 2, 3, 1, for instance. The specific selected redundancy version for the retransmission is an input value for the "rate matching" block, as illustrated in FIG. 4. Hence, for each retransmitted data block that uses a different redundancy version (RV), at least the blocks "rate matching," "Code block concatenation," "Data and Control multiplexing," and "Channel Interleaver" have to be processed again. Also, the output of the "Channel Interleaver" block then is input to the entire physical channel processing, which is illustrated in FIG. 5.

In order to achieve a significant reduction of the time needed for transmitting a retransmission of the data packet, in one implementation of the embodiment the UE uses for its retransmission of the data packet the same redundancy version as already used for the previous transmission of the data packet. Due to the UE using for its retransmission of the data packet a subset of identical transmission parameters as for the previous DCI-triggered transmission, namely the same redundancy version as for the previously transmitted data packet, all processing steps involved with the change of the redundancy version of the data packet can be skipped.

Figure 5:
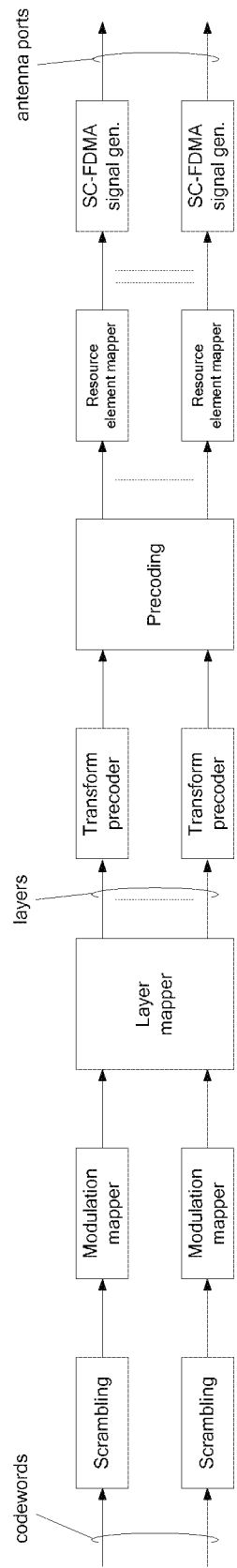

That is, even in case of only using the same RV as for the previous DCI (or HI) triggered transmission of a data packet, no new "rate matching" and subsequent blocks (as shown in FIG. 4) up to the beginning of the scrambling (as shown in FIG. 5) need to be processed. In other words, for a fast retransmission it is sufficient, if the UE buffers the codewords as they are transmitted in the most recent transmission, and does feed those buffered codewords into the physical channel processing procedure, as shown in FIG. 5.

Figure 6:
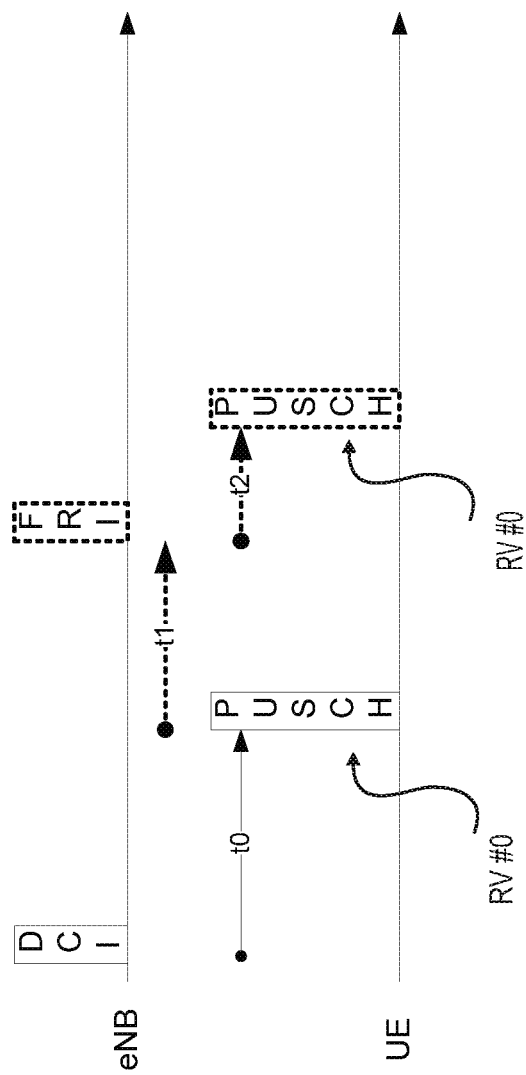
FIG. 6 illustrates a timing diagram of the transmission requests and the corresponding transmissions, according to the embodiment.

In FIG. 6, a timing diagram of the transmission requests and the corresponding transmissions is shown. As can be seen from this figure, the time period between the transmission of a DCI by the eNodeB as well as the corresponding transmission of the data packet by the UE is indicated as time period t0, wherein the time period t0 may be named as "third timing." For an uplink HARQ protocol as employed since LTE Release 8, time period t0 corresponds to the time period of 4 ms as shown in FIG. 3, where the conventional case is illustrated that relates to triggering an uplink data transmission by a DCI. As can be obtained from FIG. 6, and in contrast to FIG. 3, the time period t1 (as also shown in FIG. 6) between the transmission of a data packet by the UE (PUSCH) and the transmission of the FRI by the eNodeB may be equal to or shorter than t0, whereas in a preferred variant of the embodiment, t1, however, is smaller than time period t0. While time period t0 may become smaller than 4 ms in the further development in the future, not limiting the scope of the invention the description of the embodiments assumes that time period t0 is 4 ms, unless otherwise stated.

Thereby, as a further variant of the embodiment, the time period t1, which may be named as "first timing," is a fixed time period or a time period that is semi-statically configurable by the base station, and wherein, preferably, time period t1 may be smaller than 4 ms.

It is to be noted that an FRI generally can indicate at least two states. According to "State 1," the FRI is a "positive FRI" and triggers a fast retransmission, whereas in this case, the FRI could be seen as a negative acknowledgment of a received data packet. According to "State 2," the FRI is a "negative FM" and does not trigger a faster retransmission, since in this case, the FRI could be seen as a positive acknowledgment of a received data packet. A functionally equivalent interpretation of states is therefore that a "positive FRI" is equivalent to an FRI carrying a "negative acknowledgement (NACK)," and a "negative FRI" is equivalent to an FRI carrying an "acknowledgement (ACK)." For simplicity and without restricting the scope of the embodiment, the description hereafter uses only the terminology "positive FRI" and "negative FRI."

As further derivable from FIG. 6, the time period t2, which is defined as the time between a positive FRI sent by the eNodeB and its corresponding PUSCH transmission sent by the UE, must be smaller than time period t0, which is the time period between a DCI (or HI) and its corresponding PUSCH transmission. The shorter time period t2 compared to the time period t0 is the result of saving calculation time at the UE due to using, for a retransmission of a data packet, a subset of identical transmission parameters as for the previous DCI-/HI-triggered transmission as described above. The use of the identical redundancy version is illustrated in FIG. 6. For example, for both, the PUSCH transmission that is initiated by the DCI as well as the PUSCH transmission that is initiated by the FRI are carried out by using redundancy version RV #0. In other words, RV #0 was determined according to the DCI initiated PUSCH transmission and reused by the FRI initiated PUSCH transmission.

Thereby, as a further variant of the embodiment, the time period t2, which may be named as "second timing," is a fixed time period or a time period that is semi-statically configurable by the base station or variable based on a respective information comprised in the transmitted/received FRI. Preferably, time period t2 may be smaller than 4 ms.

According to a further implementation of the embodiment, the positive FRI indicates that the retransmission is to be performed with additional transmission parameters identical to same used for the previous transmission of the data packet, whereas these additional identical transmission parameters are then used for retransmitting the data packet by the UE and for receiving the retransmitted data packet at the base station.

According to a further implementation of the embodiment, the additional identical transmission parameter to be used for retransmitting the data packet is at least the scrambling code of the previously transmitted data packet. As an advantage of having further identical transmission parameters such as the same scrambling code is that in addition to the above mentioned skipping of the blocks "rate matching" to "Channel Interleaver" as shown in FIG. 4, also the "scrambling" block as shown in FIG. 5 does not need to be processed for the retransmitted data packet.

In further variants of the embodiment, additional identical transmission parameters may be re-used from a previous DCI initiated PUSCH transmission, up to the point where the precoded information is available, i.e., after the block "Precoding" in FIG. 5. For example, further additional identical transmission parameters may be re-using the modulation scheme and the layer mapping from a previous DCI initiated PUSCH transmission, so that the same transmission scheme is used for the retransmission as for the previous transmission, i.e., the same number of transmission layers and the same antenna ports are used. Using the same precoding vector(s) as in the previous transmission is most reasonable in case the FRI does not indicate a different precoder to be used.

However, if re-using further identical transmission parameters from a previous DCI initiated PUSCH transmission beyond the block "Precoding" as shown in FIG. 5, then only a part of the resources are utilized for the retransmission. For example, the "Resource Element Mapper" block would only map data to a part of the resources that had been used for the previous transmission, e.g., a fraction of the resource blocks such as, for example, 50% of the resource blocks. Equivalently, for a fast retransmission, only a fraction of the output of the "Resource Element Mapper" block is used as input to the "SC-FDMA signal generation" block. Therefore, it would be sufficient if the UE buffers the output of the "Resource Element Mapper" block(s) of the previous transmission, and upon being triggered for a partial retransmission, reads only the corresponding parts from the buffer and applies these as the input to the SC-FDMA signal generation. Preferably, the fraction used for a fast retransmission consists of a non-negative integer multiple of a basic time or frequency resource unit, such as a "resource block" or a "resource block group" as defined in TS 36.213. This has the advantage that unused resources can be optimally assigned to other UEs, i.e., without wasting resources caused by a fractional resource block or resource block group. In addition, the fraction should result in a bandwidth of the PUSCH in terms of resource blocks $M_{RB}^{PUSCH}$, where $M_{RB}^{PUSCH}=2^{\alpha_2} \cdot 3^{\alpha_3} \cdot 5^{\alpha_5}$ and where $\alpha_2, \alpha_3, \alpha_5$ is a set of non-negative integers. Therefore, if the indicated fraction would result in a non-integer number of resource blocks, or resource block groups, or if the resulting bandwidth $M_{RB}^{PUSCH}$ would not fulfill the condition $M_{RB}^{PUSCH}=2^{\alpha_2} \cdot 3^{\alpha_3} \cdot 5^{\alpha_5}$, the UE should preferably round up to the smallest integer number of resource blocks, or resource block groups than the indicated fraction, or to the smallest integer value $M_{RB}^{PUSCH}$ greater than the indicated fraction that fulfils $M_{RB}^{PUSCH}=2^{\alpha_2} \cdot 3^{\alpha_3} \cdot 5^{\alpha_5}$, respectively.

In a further variant of the embodiment, as an additional identical transmission parameter, the same "cyclic shift parameter" may be used as for the generation of the reference signals for the retransmission of the data packet. In this regard, reference is made to section 5.5.2 of 3GPP technical standard 36.211. Using the identical "cyclic shift parameter" for the generated reference signals results in a further reduction of the overall processing time for the retransmission. In another variant, the FRI transmitted by the eNodeB may further comprise information with regards to the "cyclic shift parameter," which is to be used by the UEs for the generation of the reference signals for the retransmission of the data packet.

It may happen that the most recent transmission of a data block does not only consist of UL-SCH data, but includes uplink control information (UCI) such as ACK/NACK, CSI. As can be seen in FIG. 4, such information is added to the data in the block "Data and control multiplexing." Generally, such information is preferably also added in a retransmission triggered by FRI in the same way as in the most recent transmission of the data block. However, transmitting the identical ACK/NACK or CSI information is not necessarily reasonable, as the content would be outdated due to the delay between the previous transmission and the triggered retransmission. Therefore, an alternative embodiment does not include the UCI in the retransmission, but reserves those resources as if the information was present. As a consequence, the order of data block bits can be unchanged, so that no further bit reordering procedure is necessary for a retransmission.

Likewise, a part of the resources of an uplink subframe may contain sounding reference symbols (SRS), preferably at the end of a subframe. In such a case, a fast retransmission may then also contain the SRS as in the previous transmission, or the resources are reserved (e.g., muted). As a consequence, the mapping of the PUSCH to the resource elements can remain unchanged, so that no further RE reordering procedure is necessary for a retransmission.

Figure 7:
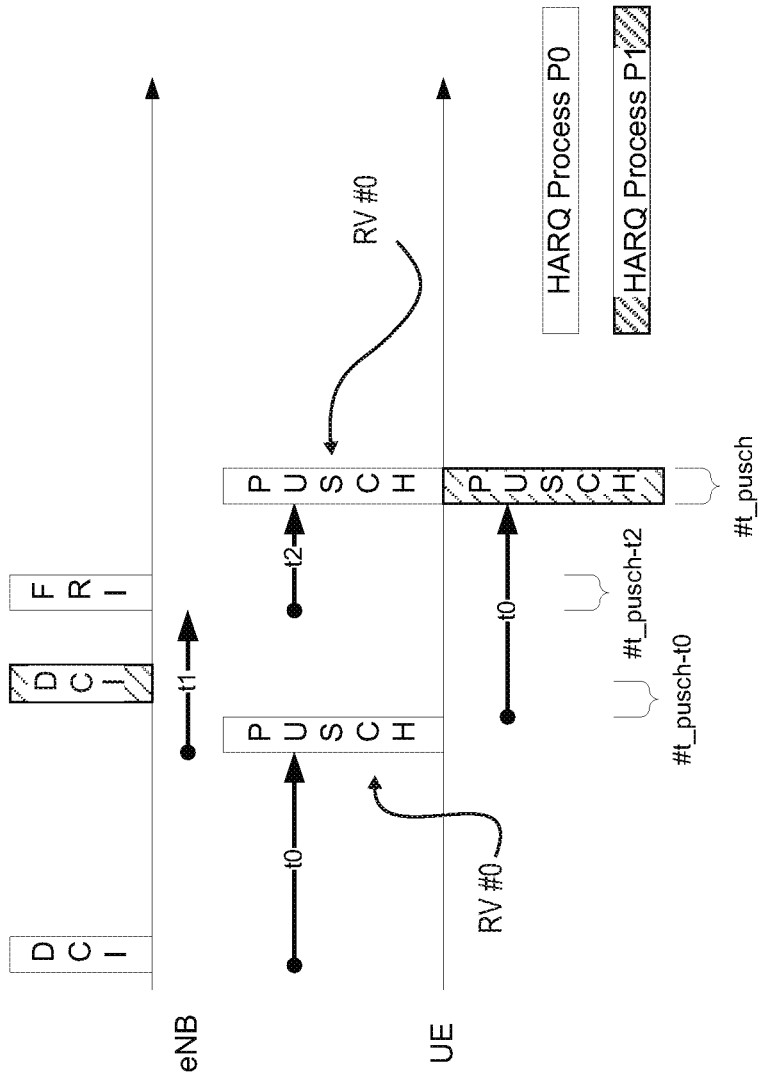
FIG. 7 illustrates a timing diagram of the transmission requests and the corresponding transmissions in case of a conflict between simultaneously requested retransmissions, according to the embodiment.

With reference to FIGS. 6 and 7, it is to be noted that the eNodeB may flexibly determine in case a data packet has not successfully been received, whether a retransmission for the data packet is requested from the UE by using the FRI, or by using a DCI, or by using a HI and thus to transmit either the FRI, the DCI, or the HI to the UE. Likewise, the UE may also flexibly react on the reception of either an FRI, a DCI, or an HI and perform a corresponding transmission/retransmission of the data packet based on the received FRI, DCI, or the HI, as described above.

According to a further implementation of the embodiment, the FRI indicates that a retransmission of a part of the previously transmitted data packet is to be performed, optionally wherein a part is 50% or 25% of the previously transmitted data packet. In such a case, the UE retransmits the indicated part of the previously transmitted data packet. The UE may adapt the transmit power for the retransmission of the part of the previously transmitted data packet so that the total transmit power for the retransmission equals the total transmit power of the previously transmitted data packet, optionally wherein using 50% of the data packet results in a transmission power increase of the part of the previously transmitted data packet by a factor 2.

If for a retransmission only a fraction of the frequency resources of the previous transmission are utilized, the total power that the UE would transmit for the partial retransmission would also be a fraction. However, in order to improve the quality of the partial retransmission data, its power can be boosted reciprocally to the fraction of the frequency resources. For example, if a partial retransmission utilizes only 50% of the frequency resources, then each RE of the partial retransmission can be boosted by a factor of 2, so that the total transmit power when regarding all transmitted REs for the partial retransmission and the full retransmission is equal. Such a partial retransmission is particularly attractive, if there is no need for a full retransmission to arrive at a successful decoding of the transport block, or if the eNodeB intends to use only parts of the frequency resources for the retransmission so that the remaining parts can be scheduled to another UE.

The amount of frequency resources to be utilized for a partial retransmission can be determined according to:

1. A semi-static configuration: Whenever a positive FRI triggers a fast retransmission, the UE looks up the configured value and applies it accordingly.

2. An indication within the FM: The FRI can carry an indicator to determine the amount of partial resources. For example, a first FRI value triggers a partial retransmission of 50%, a second FRI value triggers a partial retransmission of 25%, a third value triggers a full retransmission (i.e., 100%), while a fourth FRI value triggers no fast retransmission. Therefore, there would be three positive and one negative FRI values in this example.

Combinations of these are possible, e.g., the eNodeB configures three different partial retransmission values (possibly including 100%), and then each of the positive FRI values points to the corresponding semi-static partial retransmission value, respectively (with one FRI value indicating no fast retransmission, i.e., one negative FRI value).

In a further implementation of the embodiment, the user equipment may comprise multiple transmitting antennas for transmission of data packets. In this case, the received FRI triggers a retransmission of the data packets so that the UE retransmits the data packets to the eNode B using the multiple transmitting antennas. That is, in case that a transmission contains two transport blocks (codewords) as in SU-MIMO, a positive FRI would preferably indicate a retransmission of both transport blocks to re-use the transmission buffer as much as possible without excessive PHY re-processing, as can be appreciated in relation to FIG. 5. According to this case and referring to FIG. 5, re-using the transmission buffer in case of retransmitting both transport blocks involves that there is no need for processing the illustrated blocks of FIG. 5 at all. That is, the retransmission of the two transport blocks takes place right after the respective "SC-FDMA signal generation" block and can be directly transmitted to the eNodeB without further processing.

At the eNodeB side, which may also use multiple antennas, upon transmitting the FRI that triggers the retransmission of the transport blocks, the retransmitted transport blocks are received at the eNodeB using the multiple receiving antennas.

However, triggering a retransmission of both transport blocks by (one single) FRI comes at the expense of radio resource efficiency and signal-to-noise ratio. Therefore an alternative implementation of the embodiment would trigger a retransmission of one transport block per FRI so that the retransmission of the one transport block to the eNodeB as well as the reception of the one transport block at the eNodeB is carried out by using the multiple transmitting antennas. It is to be noted that in this case, more processing is required at the UE until the SC-FDMA signals are available for transmission. That is, with reference to FIG. 5, if the FRI triggers a retransmission of only one transport block, this involves the processing of the "Layer mapping" block up to the "SC-FDMA signal generation" blocks.

The above description relates to the behavior for retransmission, according to which it is assumed that data for the same transport blocks is used in transmissions and retransmissions, i.e., implying that a retransmission applies to the same HARQ process. However, there may also be multiple HARQ processes that can be scheduled concurrently—following a synchronous or an asynchronous protocol.

In both cases, a fast retransmission would occur in a TTI at time "#t_pusch," as illustrated in FIG. 7. A PUSCH transmission at time "#t_pusch" could therefore be triggered by a positive FRI at time "#t_pusch-t2," or by a DCI (or HI) at time "#t_pusch-t0," and generally for different HARQ processes. Therefore, in FIG. 7, different HARQ processes P0 and P1 are illustrated. In the exemplary case as shown in FIG. 7, HARQ process P0 relates to the FRI initiated retransmission at time "#t_pusch," whereas HARQ process P1 relates to the DCI initiated retransmission at the time "#t_pusch-t0."

As further shown in FIG. 7, the retransmissions for both HARQ processes P0 and P1 would result in a retransmission at time "#t_pusch." However, in order to avoid a transmission collision, the UE needs to decide what it should do at time "#t_pusch." The first option would be to carry on with a retransmission for HARQ process P0, i.e., follow the FRI trigger received at time "#t_pusch-t2." The second option would be to carry on with a retransmission for HARQ process P1, i.e., follow the DCI (or HI) received at time "#t_pusch-t0."

In this regard, a preferred implementation of the embodiment relates to the specific behavior of the UE, such that it follows the request by the FRI (that is, the afore-mentioned first option) and ignores the request by the DCI or HI, in case of receiving a request for performing the retransmission of the data packet by the FRI as well as a request for performing, at the same time, transmission of another data packet by the DCI or HI.

As shown in the background section, when there is a conflict between HI and DCI, the UE follows the DCI and ignores the HI. However, contrary thereto, in the case as provided by the alternative implementation of the embodiment, the fast retransmission should be followed and the DCI (or HI) should be ignored. This is because the positive FRI has been transmitted at a later point in time than the DCI corresponding to the same subframe. Consequently, it should be assumed that the eNodeB would only transmit a positive FRI in case it intends the UE to follow the positive FRI—and not the DCI. Otherwise it would not have triggered a retransmission by a positive FRI for that subframe.

As already described in connection with FIG. 6, also for the case that the UE follows the request by the FRI so as to avoid a transmission collision, as illustrated in FIG. 7, the use of the identical redundancy version for both, the PUSCH transmission that is initiated by the DCI as well as the PUSCH transmission that is initiated by the FRI are carried out by using redundancy version RV #0. In other words, RV #0 was determined according to the DCI initiated PUSCH transmission and re-used by the FRI initiated PUSCH transmission.

Moreover, in a further variant of the embodiment, the FRI further comprises an HARQ process number indicator so as to indicate the particular HARQ process that was used by the transmitter for the previous transmission of the data packet.

In the table below, the UE behavior is shown for several cases with respect to the content of received FRI and DCI/HI.

| Content of the FRI received by the UE | Content of the DCI (or HI) received by the UE | UE behavior |
| --- | --- | --- |
| Negative FRI | Request for New Transmission | New transmission according to DCI (or HI) |
| Negative FRI | Request for Retransmission | Retransmission according to DCI (adaptive retransmission) or according to HI (non-adaptive retransmission) |
| Negative FRI | None | No (re)transmission |
| Positive FRI | None | Fast retransmission |
| Positive FRI | Request for New Transmission or for Retransmission | Fast retransmission, wherein data for the HARQ process is kept corresponding to the DCI/HI in the buffer. A DCI is required to resume retransmissions for that HARQ process. |

In the table below, an alternative UE behavior is shown for several cases with respect to the content of received FRI and DCI/HI.

| Content of the FRI received by the UE | HARQ feedback seen by the UE (HI) | DCI seen by the UE | UE behavior |
| --- | --- | --- | --- |
| Negative FRI | ACK or NACK | Request for New Transmission | New transmission according to DCI |
| Negative FRI | ACK or NACK | Request for Retransmission | Retransmission according to DCI (adaptive retransmission) |
| Negative FRI | ACK | None | No (re)transmission |
| Negative FRI | NACK | None | Non-adaptive retransmission |
| Positive FRI | ACK | None | Fast retransmission |
| Positive FRI | NACK | None | Fast retransmission, wherein data is kept for the HARQ process corresponding to the HI in the buffer. A DCI is required to resume retransmissions for that HARQ process. |
| Positive FRI | ACK or NACK | Request for New Transmission or for Retransmission | Fast retransmission, wherein data is kept for the HARQ process corresponding to the DCI/HI in the buffer. A DCI is required to resume retransmissions for that HARQ process. |

With reference to the description provided above, the FRI may, according to one variant of the embodiment, indicate at least one of the following elements:

Whether or not a fast retransmission is triggered (positive FRI or negative FRI, or alternatively NACK or ACK);

In case of a triggered fast retransmission: The HARQ process number indicator for the triggered retransmission;

In case of a triggered fast retransmission: A fractional retransmission parameter indicating the requested part of the data block to be retransmitted;

In case of a triggered fast retransmission: An indication about the time period t2 until the UE should transmit accordingly.

According to another implementation of the embodiment, the UE receives the FRI in radio resources used for receiving the HI, or receives the FRI as a DCI (for example, in DCI format 7), or receives the FRI in preconfigured radio resources of a common search space, or receives the FRI in preconfigured radio resources of a user-equipment-specific search space.

Generally, the FRI can be transmitted in one of the following ways:
- In the same RE(s) where a UE would expect to find a PHICH (but in a different subframe in case that time period t1 is smaller than the time between a PUSCH transmission and the subframe carrying the corresponding HI), i.e., in RE(s) belonging to REGs within the control channel region of a subframe/TTI, or
- In RE(s) belonging to a common search space for DCI, i.e., in REs where all UEs detect FRI, or
- In a DCI, where preferably FRI for multiple UEs and/or subframes are multiplexed. For example, the DCI could contain four FRI, where the first FRI is applicable to UE1, the second FRI is applicable to UE2, and so on. Especially for TDD systems, several FRI could be multiplexed or bundled for one UE into a DCI, so that e.g., the first four FRI are applicable to four PUSCH transmissions of UE1, the next three FRI are applicable to three PUSCH transmissions of UE2, and so on. In case that FRI for multiple UEs are multiplexed, preferably the DCI is transmitted in the common search space. In case that FRI for only one UE are transmitted, preferably the DCI is transmitted in the UE-specific search space.

As a variant of the embodiment, instead of including one or more of the above contents into the FRI, one or more of the above could be used to determine the RE(s) where the FRI is transmitted. For example, the HARQ process could determine the RE(s) where the FRI is transmitted. A UE would then monitor multiple FRI resources and preferably evaluates only the FRI that is received with the strongest power.

As described with respect to the several variants of the embodiment above, a positive FRI would not imply an implicit or explicit change of the RV for the retransmission, in contrast to retransmissions triggered by HI described in the background section. However, as a further variant of the embodiment, a retransmission triggered by an FRI should not affect a potential RV determination rule for non-adaptive retransmissions by PHICH. As indicated previously in the background section, a retransmission triggered by PHICH implicitly cyclically switches between RV {0, 2, 3, 1}. According to this variant, a positive FRI should be ignored for purposes of RV determination for later non-adaptive retransmissions, i.e., the RV switching/cycling should only take the RV of previous DCI/HI-triggered (re-)transmissions into account.

As a further variant of the embodiment, in addition to using the FRI as described above, in case the PUSCH occupies not a full 1 ms TTI, but a short TTI (as being discussed in the Short Latency study item above), the transport blocks are smaller than in a 1 ms TTI, so that the decoding result (OK/failure) at the eNodeB would be available sooner. Hence, in this case, the FRI could be transmitted earlier than a DCI/HI in a conventional system.

As another implementation of the embodiment, a previous transmission of the data packet may be an "initial transmission of the data packet" or a "retransmission of the data packet."

Hardware and Software Implementation of the Present Disclosure

Other exemplary embodiments relate to the implementation of the above described various embodiments using hardware, software, or software in cooperation with hardware. In this connection a user equipment (mobile terminal) is provided. The user equipment is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment operating a transmission protocol for uplink data packet transmission in a communication system, the user equipment comprising:
   a receiver operative to receive a Fast Retransmission Indicator, (FRI), wherein the FRI indicates that a base station requests a retransmission of a previously-transmitted data packet using identical transmission parameters as the previously-transmitted data packet; and
   a transmitter operative to retransmit the data packet using the identical transmission parameters as already used for the previously-transmitted data packet.

2. The user equipment according to claim 1, wherein the FRI indicates that the retransmission is to be performed with an identical redundancy version as used for the previously-transmitted data packet, and wherein the transmitter is further operative to use the identical redundancy version as the previously-transmitted the data packet for retransmitting the data packet.

3. The user equipment according to claim 2, wherein the identical transmission parameters include a scrambling code of the previously-transmitted data packet.

4. The user equipment according to claim 1, wherein the FRI indicates that a retransmission of a part of the previously-transmitted data packet is to be performed, wherein the part is 50% or 25% of the previously-transmitted data packet, and wherein the transmitter is further operative to retransmit the indicated part of the previously-transmitted data packet.

5. The user equipment according to claim 4, wherein the transmitter is further operative to use a transmit power for the retransmission of the part of the previously transmitted data packet so that a total transmit power for the retransmission equals a total transmit power of the previously transmitted data packet, wherein using 50% of the data packet results in a transmission power increase of the part of the previously-transmitted data packet by a factor 2.

6. The user equipment according to claim 1, wherein the receiver is further operative to receive the FRI at a first timing after the transmission of the previous data packet, wherein the first timing is fixed or semi-statically configurable by the base station.

7. The user equipment according to claim 1, wherein the transmitter is further operative to transmit the retransmission of the data packet at a second timing after reception of the FRI by the receiver, and wherein the second timing is fixed, semi-static configurable by the base station, or variable based on a respective information included in the received FRI.

8. The user equipment according to claim 1, wherein the retransmission of the data packet is triggered by a Downlink Control Information (DCI) or a HARQ Indicator (HI), and wherein a first time period between the previous transmission of the data packet and the reception of the FRI, or a second time period between the reception of the FRI and the retransmission of the data packet is smaller than a third time period between reception of the DCI or HI and its corresponding retransmission of the data packet, wherein at least one of the first and second time periods is smaller than 4 ms.

9. The user equipment according to claim 8, wherein in case the receiver receives a request for performing the retransmission of the data packet by the FRI and a request for performing, at the same time, transmission of another data packet by the DCI or HI, the transmitter is further operative to follow the request by the FRI and to ignore the request by the DCI or HI.

10. The user equipment according to claim 1, wherein the FRI further comprises an HARQ process number indicator for indicating a HARQ process that was used by the transmitter for the previous transmission of the data packet.

11. The user equipment according to claim 1, wherein the previous transmission of the data packet is an initial transmission or a retransmission of the data packet.

12. The user equipment according to claim 1, wherein the receiver is further operative to receive the FRI in radio resources used for receiving an HI, or to receive the FRI as a DCI, or to receive the FRI in preconfigured radio resources of a common search space, or to receive the FRI in preconfigured radio resources of a user-equipment-specific search space.

13. The user equipment according to claim 1, wherein when the user equipment uses multiple transmitting antennas for transmission of data packets:
   the receiver is further operative to receive the FRI that triggers a retransmission of the data packets; and
   the transmitter is further operative to retransmit the data packets to the base station using the multiple transmitting antennas;
   or wherein:
      the receiver is further operative to receive the FRI that triggers a retransmission of one of the data packets; and
      the transmitter is further operative to retransmit the one of the data packets to the base station using the multiple transmitting antennas.

14. A base station for operating a transmission protocol for uplink data packet transmission in a communication system, wherein the base station comprises:
   a transmitter operative to transmit a Fast Retransmission Indicator (FRI), wherein the FRI indicates to a user equipment that a retransmission of a previously-transmitted data packet is requested using identical transmission parameters as the previously-transmitted data packet; and
   a receiver operative to receive, from the user equipment, a retransmitted data packet with the identical transmission parameters as already used, by the user equipment, for the previously-transmitted data packet.

15. A method for operating a transmission protocol in a user equipment for uplink data packet transmission in a communication system, the method comprising:
   receiving a Fast Retransmission Indicator (FRI), wherein the FRI indicates that a base station requests a retransmission of a previously-transmitted data packet using identical transmission parameters as the previously-transmitted data packet; and
   retransmitting the data packet using the identical transmission parameters as already used for the previously-transmitted data packet.

* * * * *